(12) United States Patent
Lipowski et al.

(10) Patent No.: US 12,647,141 B2
(45) Date of Patent: Jun. 2, 2026

(54) FIXED WIRELESS NODE WITH FREQUENCY SYNTHESIZER

(71) Applicant: Verizon Patent and Licensing Inc., Basking Ridge, NJ (US)

(72) Inventors: Joseph Thaddeus Lipowski, Norwell, MA (US); Dimitar Stoilov Dimitrov, Cambridge, MA (US); Jesse Lloyd Rhodes, Franklin, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 18/418,463

(22) Filed: Jan. 22, 2024

(65) Prior Publication Data

US 2024/0267066 A1      Aug. 8, 2024

Related U.S. Application Data

(60) Provisional application No. 63/483,019, filed on Feb. 3, 2023.

(51) Int. Cl.
H04B 1/04          (2006.01)
H04B 1/00          (2006.01)
H04L 7/04          (2006.01)

(52) U.S. Cl.
CPC ............. H04B 1/04 (2013.01); H04B 1/0096 (2013.01); H04L 7/04 (2013.01); H04B 2001/0416 (2013.01)

(58) Field of Classification Search
CPC ................... H04B 1/04; H04B 1/0096; H04B 2001/0416; H04L 7/04
See application file for complete search history.

(56) References Cited

U.S. PATENT DOCUMENTS

| | | | | |
|---|---|---|---|---|
| 8,014,422 B2 * | 9/2011 | Rofougaran | ........ | H04L 27/0014 455/260 |
| 2005/0232194 A1 * | 10/2005 | Hanna | ................ | H04B 7/15535 370/503 |
| 2007/0115160 A1 * | 5/2007 | Kleveland | ........... | H04L 27/2331 341/144 |
| 2014/0119392 A1 * | 5/2014 | Keegan | .................. | H04L 27/00 370/542 |
| 2017/0180160 A1 * | 6/2017 | Moorti | ................ | H04L 27/2651 |
| 2018/0262994 A1 * | 9/2018 | Park | ...................... | H04W 52/52 |
| 2019/0089434 A1 * | 3/2019 | Rainish | .................. | H04B 7/086 |

* cited by examiner

*Primary Examiner* — Fayyaz Alam

(57) ABSTRACT

A high frequency data network access system includes an aggregation node and endpoint nodes that employ an approach to achieve frequency stability without the need for a separate auxiliary radio frequency (RF) signal, such as a GPS signal, which would require its own receiver and antenna. The endpoint and/or subscriber nodes derive the timing and frequency stability, and specifically disciplines a local reference oscillator and local reference time base.

16 Claims, 3 Drawing Sheets

FIXED WIRELESS NODE WITH FREQUENCY SYNTHESIZER

RELATED APPLICATIONS

This application claims the benefit under 35 U.S.C. § 119(e) of U.S. Provisional Application No. 63/483,019, filed on Feb. 3, 2023, which is incorporated herein by reference in its entirety.

BACKGROUND OF THE INVENTION

Internet service providers (ISPs) have historically used a number of different technologies in their subscriber or internet access networks to deliver network connectivity to premises such as single family residential homes, multi-dwelling residential units, and businesses. Initially premises were connected via dial-up connections over POTS lines, or ISDN. Often businesses used T-1 to T-3 connections.

Nowadays, DSL, cable and optical fiber networks are common in urban and metropolitan, and even some rural areas to provide network access.

Fixed wireless network access has historically been another option in some areas. Wireless ISPs (or WISPs) provide the wireless network access by transmitting and receiving data to and from endpoint nodes, usually at premises, as radio waves via transmission towers. This has been typically used in rural areas where cable and optical fiber networks are not available.

More recently, WISPs have begun deploying wireless access systems in metropolitan and suburban areas. Their systems generally utilize high frequency wireless data networks, typically operating in the 10 GHz to 300 GHz band, to enable communications between aggregation nodes and one or more high frequency endpoint nodes such as fixed subscriber nodes and/or multi-dwelling unit subscriber nodes, in star-topology networks. One system employs phased arrays at the aggregation nodes.

SUMMARY OF THE INVENTION

The present invention concerns the endpoint or subscriber nodes in a fixed wireless communications network and specifically an approach to achieve frequency stability without the need for a separate auxiliary radio frequency (RF) signal, such as a global positioning system (GPS) signal or signal from any of the other GNSSs (Global Navigation Satellite Systems), which would require its own receiver and antenna. Thus, the cost and size of these nodes can be reduced. The endpoint or subscriber nodes instead derive the timing and frequency stability, and specifically disciplines a local reference oscillator and local reference time base.

In more detail, often the aggregation node and the endpoint or subscriber nodes externally derive timing and frequency synchronization with such timing derived from the GPS signal received by both the aggregation node and the endpoint or subscriber nodes. To utilize inexpensive system on chip (SOC) commercial off the shelf (OTS) Wi-Fi integrated circuits (ICs) in a mmWave system, i.e., transmitting in the 10 GHz to 300 GHz band, the input and output frequencies native to these ICs must be translated to the mmWave frequencies and back to the SOC's normal operating frequencies with minimal frequency error. A very accurate local oscillator is thus needed for this purpose, and previously a GPS-DO (GPS disciplined local reference oscillator) has been employed to recreate a highly accurate frequency signal, tied to GPS. Since the same GPS signal is received in both the aggregation node and the endpoint or subscriber nodes, the frequency difference between the two can be made very small. However, the antennas for both the terminal and the base station must have a mostly clear view of the sky and these antennas and GPS receivers add expense.

In general, according to one aspect, the invention features a method for frequency synchronization of subscriber nodes in a millimeter wave fixed wireless access network. The method comprises downconverting an input signal to an intermediate frequency (IF), amplifying the downconverted IF signal to a certain amplitude range using a variable gain amplifier, converting the amplified signal into a digital signal, using an analog to digital converter (ADC), correlating the digital signal with a delayed input signal to form a correlated output signal, and feeding the correlated output signal to a frequency synthesizer, for the frequency synchronization of the terminal devices in the millimeter wave fixed wireless access network.

In embodiments, a magnitude of the correlated output signal is squared and fed to an automatic gain control (AGC) for setting a variable gain.

An immediate estimation of the frequency can be formed using an angle of the correlated output signal. This frequency estimate can be windowed to select valid window samples and exclude invalid samples when buffer has not been filled up and timing for the windowed frequency estimate might be set by a valid packet timing detector.

The valid window samples can be scaled such that a scaled error is driven to a pre-determined tolerance by adjusting the frequency in the frequency synthesizer using digital means, such as a fractional-N or Direct Digital Synthesizer. Alternatively an analog input could be generated from a series of valid window samples and this could be applied to a voltage controlled crystal oscillator.

In general, according to another aspect, the invention features a node in a millimeter wave fixed wireless access network. This node comprises a mixer for up converting intermediate frequency signals from a modem to high frequency signals for transmission to an aggregation node and for down converting high frequency signals received from an aggregation node to intermediate frequency signals for the modem, a variable gain amplifier is configured to amplify intermediate frequency signals to a certain range, an analog-to-digital converter (ADC) configured to convert the amplified signal to a digital signal, a correlator processing the digital signal with a delayed input signal to form a correlated output signal; and a frequency synthesizer for generating a local oscillator signal for the mixer based on the correlated output signal.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

The invention now will be described more fully hereinafter with reference to the accompanying drawings, in which illustrative embodiments of the invention are shown. This invention may however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
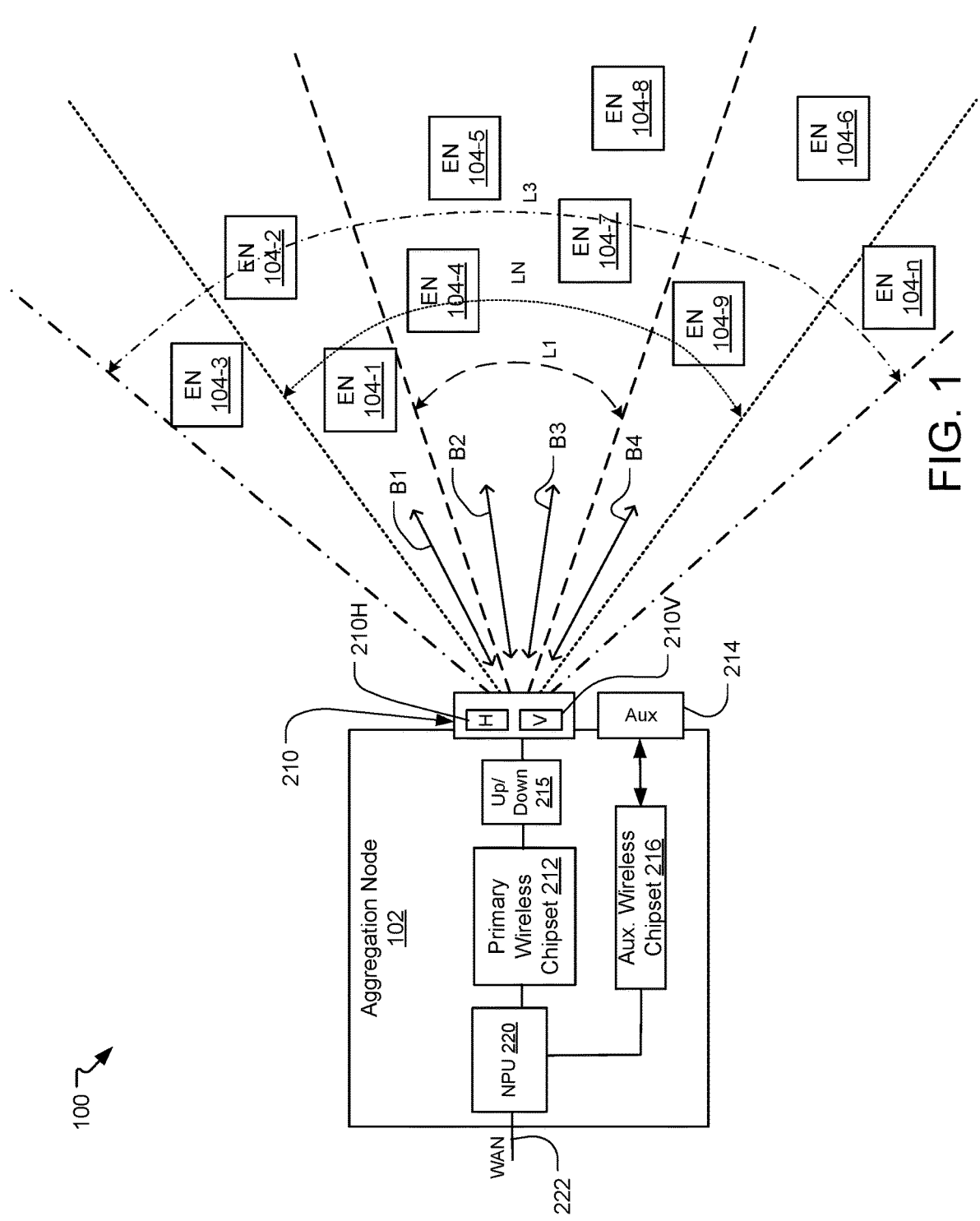
FIG. 1 is a block diagram showing an aggregation node and endpoint nodes in a fixed wireless access system.

FIG. 1 shows a network access system 100, which has been constructed according to the principles of the present invention.

In this system 100, a fixed wireless internet service provider (WISP) installs an aggregation node 102 that communicates with a plurality of high frequency network endpoint or subscriber nodes 104, e.g., 104-1, 104-2, . . . , and 104-n.

The aggregation node 102 preferably utilizes a phased array antenna system 210 to communicate with the endpoint nodes 104-1-104-m to form a high frequency network, which preferably operates between 10 and 300 GHz, or more commonly between about 20 and 60 GHz. The antenna system 210 typically covers an azimuthal sweep arc of between about 30 degrees and 180 degrees.

The phased array antenna system 210 forms transmit and receive beams B1-B*n* for downlink and uplink, respectively, communication with each of the endpoint nodes 104-1 -104-n by executing digital beamforming. In this way, the aggregation node 102 reduces interference between adjacent aggregation nodes, conserves power on the downlinks and reduces transmit power requirements by the endpoint nodes on the uplinks.

Each endpoint node 104 communicates with the aggregation node 102 by means of an electronic assembly or system that provides a wireless ISP (internet service provider) handoff at the premises where each endpoint node 104 is installed.

Locally the endpoint node 104, in a typical residential deployment, communicates with a modem/edge router or access point over possibly a WiFi tunnel (in the 2.4 or 5 GHz bands or the WiGig tri-band in the 2.4, 5 and 60 GHz bands, or IEEE 802.11ac, IEEE 802.11ad-2012) or via a wired connection (e.g., 1000BASE-T or G.hn). This modem/router or access point then maintains the wired and/or wireless local area network (LAN) at the subscriber's premises. In the case of a multidwelling unit, the endpoint node will typically communicate with multiple modem/edge routers for each of the subscribers in the multidwelling unit.

In other cases, the endpoint node 104 itself maintains the wired and/or wireless LAN at the premises. It provides typical functions associated with LAN routers, such as Network Address Translation (NAT), guest networks, Parental Controls and other Access Restrictions, VPN Server and Client Support, Port Forwarding and UPnP, and DHCP (Dynamic Host Configuration Protocol) server that automatically assigns IP addresses to network devices on the LAN.

According to a preferred embodiment, the aggregation node 102 includes multiple wireless chipsets that encode and decode signals at radio frequencies. Specifically, in the current example, primary wireless chipset 212 communicates via a primary antenna system 210, and an auxiliary wireless chipset 216 communicates via an auxiliary antenna system 214.

These chipsets are often commercially available systems of one or more chips. In examples, they implement the IEEE 802.11 standard, i.e., IEEE 802.11ac or 802.11ax. These chipsets are capable of maintaining multiple spatial streams such as provided by the IEEE 802.11ac or 802.11ax versions and follow-on versions of the standard. Each of these WiFi chipsets 212, 216 produces intermediate frequency or WiFi signals, which are signals that have been encoded according to the IEEE 802.11 standard. Any of the traditional WiFi bands can be used such as 900 MHz, 2.4 GHz, 3.6 GHz, 4.9 GHz, 5 GHz, 5.9 GHz.

These intermediate frequency or WiFi signals, typically in the 5-6 GHz band, from the primary wireless chipset 212, are then upconverted to high frequency signals to frequencies between 10 and 300 GHz by an up/down convert section 215, or more commonly between about 20 and 60 GHz band, and transmitted to the endpoint nodes 104. In turn, the endpoint nodes transmit high frequency signals back, which signals are downconverted by the converter 215 to intermediate frequency or WiFi signals at the conventional frequencies such as 5-6 GHz band and then decoded by the primary wireless chipset 212.

The auxiliary wireless chipset 216 communicates with the endpoint nodes via auxiliary antenna system 214 at the standard WiFi frequencies such as 5-6 GHz.

A network processing unit 220 controls the primary wireless chipset 212 and the auxiliary wireless chipset 216 to direct packets received via the wide area network (WAN) link 222 to the endpoint nodes 104 and sends or forwards packets from the endpoint nodes over the WAN link 222.

In general, the network processing unit 220 employs the primary wireless chipset 212 for most communications. However, in the event that the high-frequency link between the aggregation node 102 and a particular endpoint node 104 is impaired, a lower frequency data link is utilized via the auxiliary wireless chipset 216 until the high-frequency link resumes normal operation.

In the current embodiment, the primary antenna system 210 includes both a horizontal polarization phased array antenna 210H and a vertical polarization phased array antenna 210V. Employing both horizontal and vertical polarization links take maximum advantage of the orthogonality of the channel, thus equivalently doubling the available bandwidth in any given allocated frequency spectrum.

Figure 2:
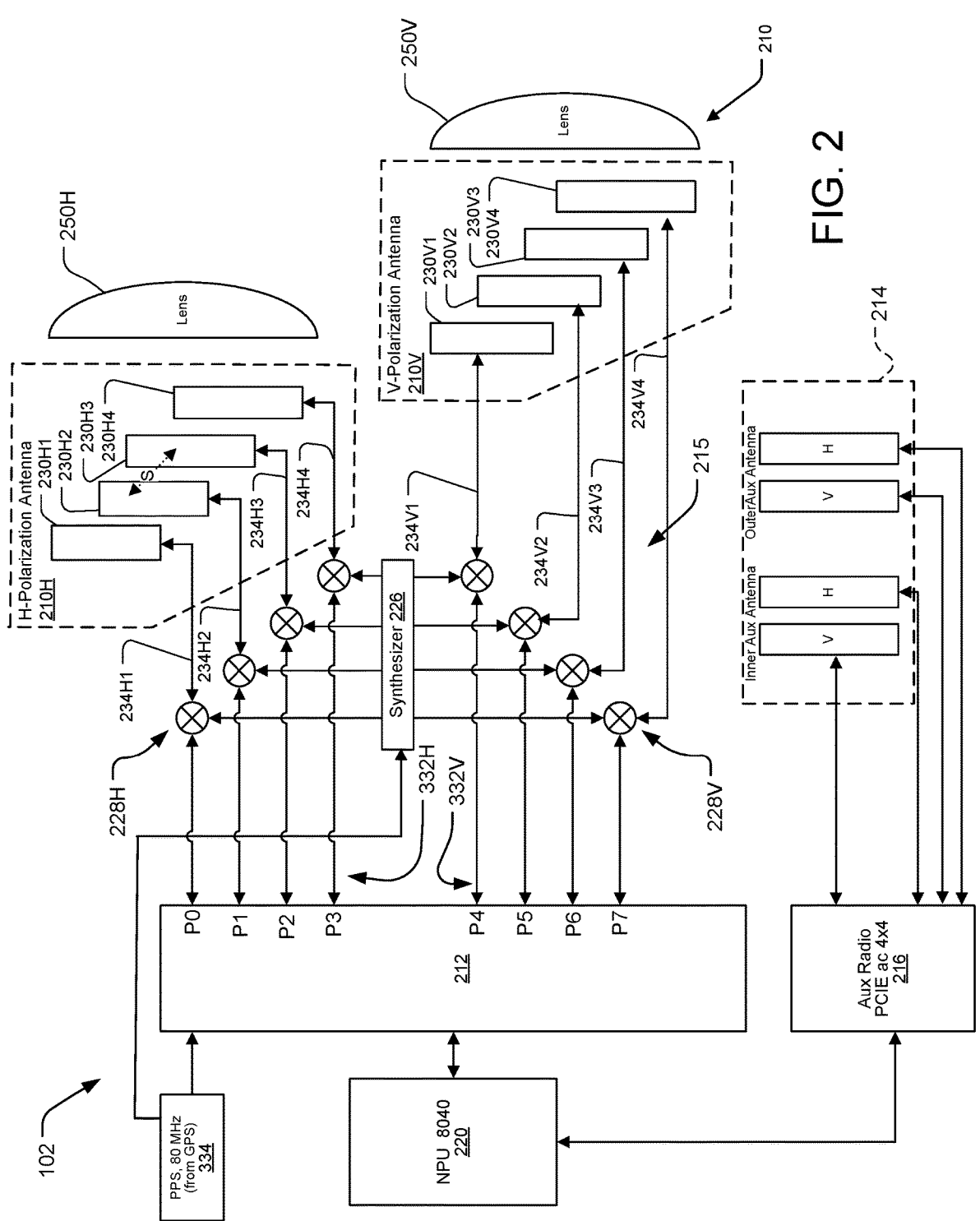
FIG. 2 is a block diagram of the aggregation node.

FIG. 2 shows the details of the aggregation node 102.

In more detail, the primary wireless chipset 212 includes eight send and receive antenna feedlines in the specific example shown. Four of those feedlines 332H are used for the horizontal polarization antenna 210H and four feedlines 332V are used for the vertical polarization antenna 210V. In the current embodiment, the primary wireless chipset 212 operates at radio frequencies. Specifically, the feedlines 332H, 332V carry signals that have carrier frequencies of between 5-6 GHz. Up and down frequency conversion for each set of feedlines 332H, 332V is accomplished using a respective set of mixers 228H, 228V, which form part of the up/down convert section 215. The up/down conversion is provided to and from the 10 and 300 GHz band. A current example operates at 37 GHz.

Each of the mixers in each set 228H, 228V receives a local oscillator signal LO generated by a synthesizer 226 which is also part of the convert section 215. This synthesizer generates the local oscillator LO signal based on an 80 MHz GPS signal derived from or synchronized with a GPS receiver 334.

The four feedlines 234H1-234H4 for the H-polarization antenna 210H terminate at respective four columnar radiating elements 230H1-230H4 of the horizontal polarized antenna 210H. Each of these radiating elements 230H is rectangular extending in the vertical direction. Typically, each of the radiating elements is a set of apertures or patches arranged in a line. Each radiating element will preferably include at least 4 but typically 8 or more apertures or patches. The center-to-center horizontal spacing S between the radiating elements 230H is a function of the wavelength of the transmitted signals. The spacing S is preferably about half the wavelength. Thus, at the current operating frequencies, the spacing S is between 3 millimeters and 5 millimeters.

The same arrangement is used for the feedlines 234V1-234V4 and radiating elements 230V1-230V4 of the vertically polarized antenna 210V.

Each of the individual paths on the transceiver is calibrated during manufacturing or continuously in operation, so that all paths produce equal power at their outputs.

In other examples, the calibrated power to the outer columnar radiating elements is reduced with respect to the inner columnar radiating elements for both antennas 210H, 210V. Specifically, in the context of H-polarization antenna 210H, for example, the power to the two outer elements 230H1 and 230H4 is lower than to the two inner elements 230H2, 230H3. This same arrangement is used for the other antenna 210V. The result is lower side lobe radiation. In one example, this is accomplished by providing less RF transmitter power and less receive gain to the feedlines to the outer elements 230H1 and 230H4 relative to 230H2 and 230H3.

The primary wireless Modem chipset 212 employs digital beamforming-and thus can support simultaneous separate spatial streams to each of the endpoint nodes EN 104 by digitally changing the phase of the signals generated and detected at each of eight antenna pins P0-P7 of the chipset 212.

In a current example, for each polarization (horizontal and vertical), the equivalent beam has a nominal single beamwidth (main lobe) of about 30 degrees, and is scanned over the 120 degree sweep arc if the respective lens 250H, 250V of the lens system 250 has no optical power or is flat or no lens is used. Lenses 250H, 250V with optical power can be added enabling expansion or reduction of the beamwidth and scan angle.

Figure 3:
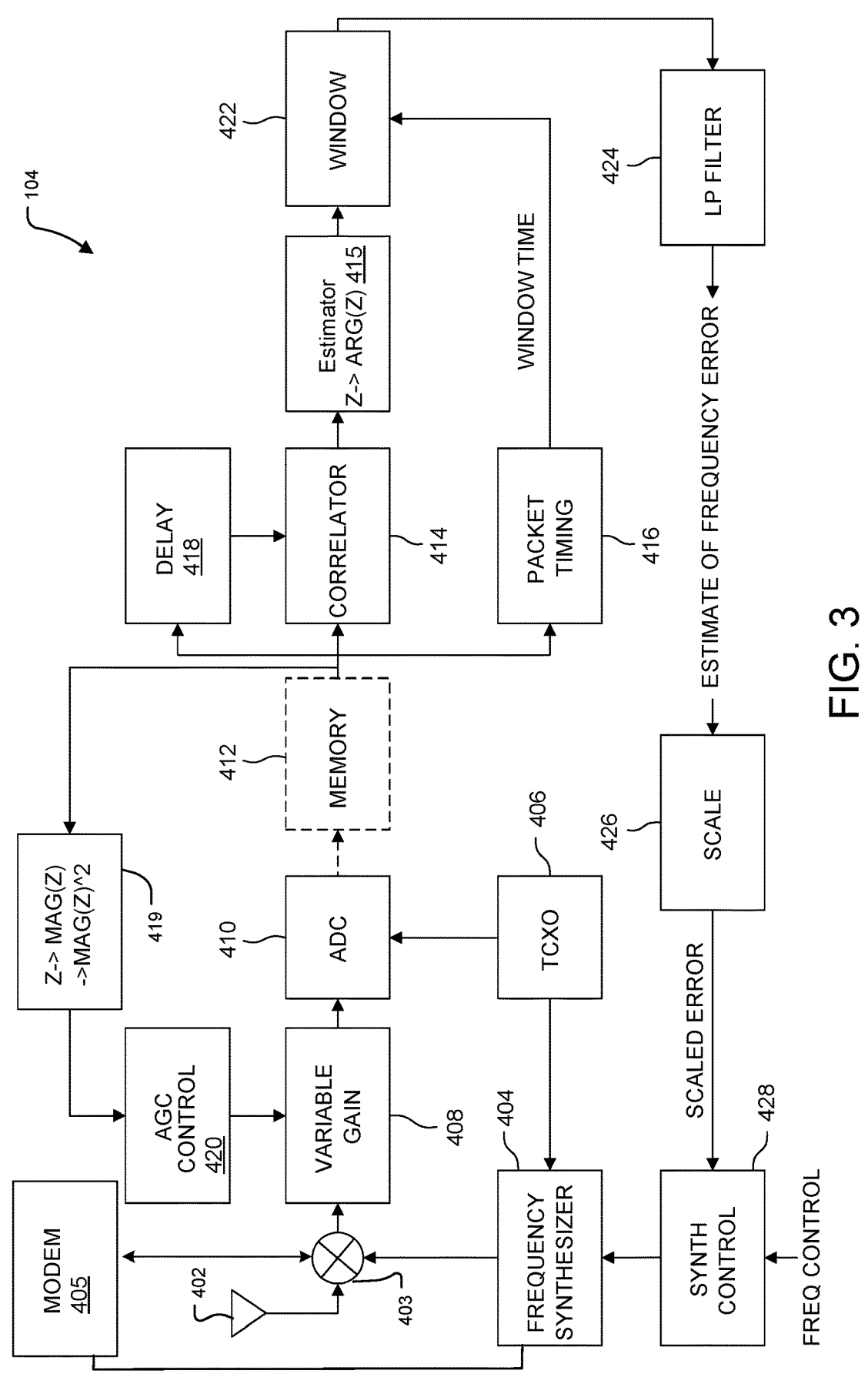
FIG. 3 is a block diagram of the endpoint node.

FIG. 3 depicts the endpoint or subscriber nodes 104 including the components that are used to synchronize to the aggregation node.

The subscriber node 104 has an antenna 402 for maintaining the high frequency link to the aggregation node 102. High frequency signals are downconverted in the mixer 403 to intermediate frequency or WiFi frequency range signals at the conventional frequencies such as 5-6 GHz band and then decoded by the WiFi modem 405. Similarly, at the correct timing as per the 802.11 protocol, the modem provides intermediate frequency or WiFi signals at the conventional frequencies, from the modem 405 are upconverted by the mixer 403 to high frequency signals for transmission to the aggregation node 102.

The subscriber node 104 is able to maintain timing synchronization without the need for a GPS or another signal separate from the 802.11 PHY based packets received from the aggregation node.

Specifically, the mixer 403 creates an intermediate frequency which is equivalent to a complex baseband signal using the output of a frequency synthesizer 404, whose reference is a Temperature Compensated Crystal Oscillator 406. A variable gain amplifier 408 is used to set the best range for an analog to digital converter (ADC) 410 to maximize the dynamic range. Then, the downconverted signal is transformed to digital format by the ADC. The output of the ADC is fed into a memory 412 to permit non-real time processing by the following blocks.

It should be noted that the memory may not be required in all uses, and it may be a buffer contained within an FPGA or ASIC. The ADC samples at a rate of 20 MHz or a multiple of that. The magnitude of the output of the memory if so used, or alternatively the output of the ADC 410 is squared by block 419, forming a reading of the incoming received power and used by the AGC Control 420 to set the variable gain of the amplifier 408. This signal may be smoothed by a windowed low pass filter.

A delay 418 of 1.6 microseconds is used so that each incoming signal's complex conjugate is multiplied by the delayed version in a correlator 414, thus creating a complex output Z for each sampled point.

The angle of the correlated signal from the correlator 414 is used by frequency estimator 415 to create an immediate estimate of the frequency by the formula:

$$\text{Frequency estimate} = \text{Delta Omega}/\text{delta } T = -1/\text{angle}(Z)/(2*pi*\text{delay length}).$$

This frequency estimate is then windowed in window block 422 to not include the samples when the buffer has not yet been filled up, that is, e.g. for a 20 MHz sampling rate, the first 32 samples are invalid. The timing for the window is set by the valid packet timing detector. The valid samples are sent on.

To improve the accuracy overall, many such valid, window samples from many STFs are averaged together using a LowPass Filter 424. This can be a moving average filter or more ideally a finite impulse response filter (FIR). The output of this filter 424 is scaled so that an estimate produced by a scale block 426 of the offset is applied to the synthesizer control 428 such that the scaled error is driven to a predetermined tolerance by adjusting the frequency in the synthesizer 404 using digital means, such as a fractional-N or Direct Digital Synthesizer. An alternative can be to use a Voltage Controlled TCXO with an integer or fractional-N synthesizer with fixed parameters, and the voltage changed to the variable oscillator circuit.

The synthesizer 404 also provides the modem 505 with a separate output, such as at 80 MHz or 10 MHz as it must also be synchronized.

In this way, the present system provides a stable oscillator for the mixer to up/down convert between the high frequency network, which preferably operates between 10 and 300 GHz, and the modem 405 that process signals that have been encoded according to the IEEE 802.11 standard at any of the traditional WiFi bands such as 900 MHz, 2.4 GHz, 3.6 GHz, 4.9 GHz, 5 GHz, 5.9 GHz.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for frequency synchronization of a node in a millimeter wave fixed wireless access network, the method comprising: downconverting frequency of an input signal to an intermediate frequency (IF); amplifying the downconverted IF signal to an amplified signal using a variable gain amplifier; converting the amplified signal into a digital signal, using an analog to digital converter (ADC); correlating the digital signal with a delayed input signal to form a correlated output signal; and feeding the correlated output signal to a frequency synthesizer, for the frequency synchronization of the terminal devices in the millimeter wave fixed wireless access network.

2. The method of claim 1, wherein the magnitude of the output signal of the ADC or a memory is squared and fed to an automatic gain control (AGC) for setting a variable gain.

3. The method of claim 1, further comprising forming an immediate estimation of the frequency using an angle of the correlated output signal.

4. The method of claim 3, wherein the frequency estimate is windowed to select valid window samples and exclude invalid samples when buffer has not been filled up.

5. The method of claim 4, wherein timing for the windowed frequency estimate is set by a valid packet timing detector.

6. The method of claim 4, further comprising averaging the valid window samples using a low pass filter (LPF).

7. The method of claim 6, wherein the valid window samples are scaled such that a scaled error is driven to a pre-determined tolerance by adjusting the frequency in the frequency synthesizer using digital means, such as a fractional-N or Direct Digital Synthesizer.

8. The method of claim 1, wherein the node is a subscriber node.

9. A node in a millimeter wave fixed wireless access network, comprising:

mixer for up converting intermediate frequency signals from a modem to high frequency signals for transmission to an aggregation node and for down converting high frequency signals received from an aggregation node to intermediate frequency signals for the modem;

a variable gain amplifier is configured to amplify intermediate frequency signals to an amplified signal;

an analog-to-digital converter (ADC) configured to convert the amplified signal to a digital signal;

a correlator for processing the digital signal with a delayed input signal to form a correlated output signal; and a frequency synthesizer for generating a local oscillator signal for the mixer based on the correlated output signal.

10. The node of claim 9, wherein magnitude of the ADC or a memory is squared and fed to an automatic gain control (AGC) for setting a variable gain.

11. The node of claim 9, further comprising an estimator for forming an immediate estimation of the frequency using an angle of the correlated output signal.

12. The node of claim 11, wherein the frequency estimate is windowed to select valid window samples and exclude invalid samples when buffer has not been filled up.

13. The node of claim 12, wherein timing for the windowed frequency estimate is set by a valid packet timing detector.

14. The method of claim 4, further comprising a low pass filter for averaging the valid window samples.

15. The node of claim 14, wherein the valid window samples are scaled such that a scaled error is driven to a pre-determined tolerance by adjusting the frequency in the frequency synthesizer using digital means, such as a fractional-N or Direct Digital Synthesizer.

16. The node of claim 9, wherein the node is a subscriber node.

\* \* \* \* \*